United States Patent [19]
Schmitt et al.

[11] Patent Number: 5,843,282
[45] Date of Patent: Dec. 1, 1998

[54] HEATED ROLL BEARING SYSTEM

[75] Inventors: Anton Schmitt, Heidenheim; Thomas Mack, Sontheim, both of Germany

[73] Assignee: Voith Sulzer Papiermaschinen GmbH, Heidenheim, Germany

[21] Appl. No.: 812,751

[22] Filed: Mar. 6, 1997

[30] Foreign Application Priority Data

Mar. 9, 1996 [DE] Germany ................ 196 09 214.0

[51] Int. Cl.⁶ .................. F16C 19/00; F16C 25/08; D21F 7/00
[52] U.S. Cl. .................. 162/272; 162/375; 165/90; 384/557; 384/905; 492/46
[58] Field of Search .................. 162/359.1, 375, 162/272, 357; 384/493, 55.7, 905; 492/46; 165/90

[56] References Cited

U.S. PATENT DOCUMENTS 3,704,669 12/1972 Christoff .................. 165/90
4,673,302 6/1987 LaRou .................. 384/548

FOREIGN PATENT DOCUMENTS

| 2 328 989 | 6/1973 | Germany | F16C 13/02 |
| 3417 093 | 5/1984 | Germany | F16C 13/00 |
| 3421 632 | 6/1984 | Germany | D21G 3/02 |
| 42 10 685 | 4/1992 | Germany | F16C 13/02 |

OTHER PUBLICATIONS

SKF "The CARB Bearing—A Better Solution For the Front Side of Drying Cyclinders", 1996.

*Primary Examiner*—Karen M. Hastings
*Attorney, Agent, or Firm*—Taylor & Associates, P.C.

[57] ABSTRACT

The invention is directed to an apparatus to produce layers of material, such as paper, carton or cardboard, under use of at least one roll that can be heated in a controlled manner, in particular a dryer cylinder, with tubing attached to the end of the roll that supplies the energy necessary to heat up the roll. Bearings at both ends of the roll are mounted to a seating structure. One of the bearings is a freely carrying bearing and the steam supply is rigidly attached to the seating structure.

9 Claims, 1 Drawing Sheet

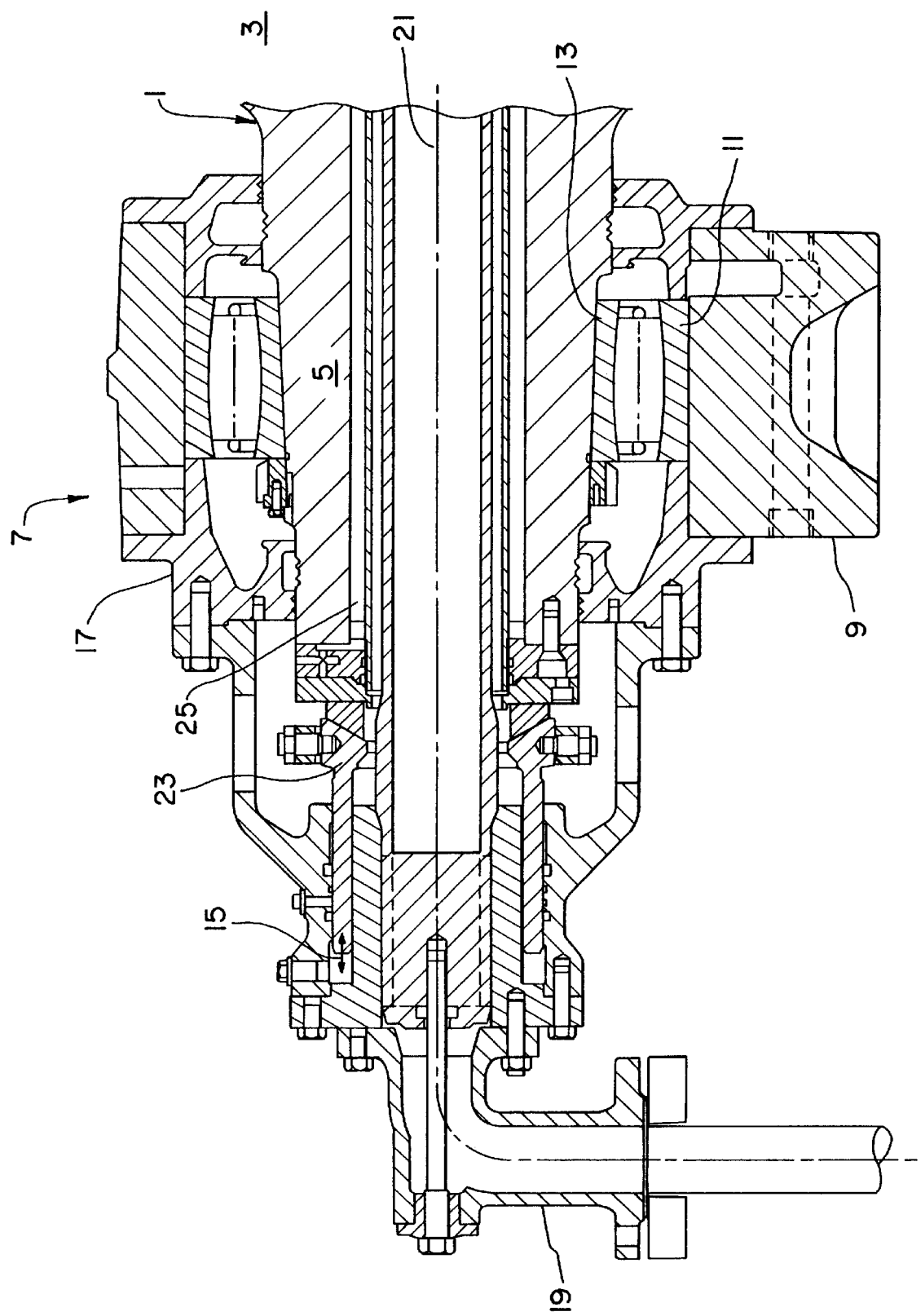

HEATED ROLL BEARING SYSTEM

BACKGROUND OF THE INVENTION

1. Field of the Invention

The present invention relates to an apparatus for the production of a continuous layer of material such as paper, carton or cardboard, and, more particularly, to such an apparatus which includes at least one roll which can be heated in a controlled manner.

2. Description of the Related Art

Apparatus for the production of a continuous layer of material such as paper, carton or cardboard are already well known. In order to heat up certain rolls within such an apparatus, it is quite common to attach steam carrying pipes to these rolls. Since the rolls expand upon heating in all directions, especially along their longitudinal direction, i.e., along the axis about which the roll rotates in service, it may be necessary to incorporate a device that compensates for any thermal expansion, e.g., longitudinal expansion, of the roll. The construction of such thermal expansion compensating devices are relatively complex and thus rather expensive.

SUMMARY OF THE INVENTION

The present invention provides an apparatus as described above which does not have any of the before mentioned disadvantages.

An apparatus to produce a continuous layer of material is provided that includes one of a plurality of bearings which is freely carrying, and provides room for some movement that can compensate for the thermal expansion that the roll incurs. Thermal expansions along the longitudinal axis about which the roll rotates are accommodated by the bearing so that the roll will not be moved relative to the seating structure. It is therefore possible to attach the supply tubing firmly with the seating structure, which means that expansion compensating mechanisms are not necessary.

A particularly desirable embodiment of the apparatus is a construction where the supply tubing is through the housing of the bearing directly connected to the seating structure. This allows for compensation of thermal expansion of the roll without effects on the supply tubing.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, which is a fragmentary, side sectional view of an embodiment of an apparatus of the present invention to produce layers of material, detailing the end of a roll which can be heated in a controlled fashion.

The exemplification set out herein illustrates one preferred embodiment of the invention, in one form, and such exemplification is not to be construed as limiting the scope of the invention in any manner.

DETAILED DESCRIPTION OF THE INVENTION

The present invention applies generally to any sort of apparatus for the production of continuous layers of material under use of a roll which can be heated in a controlled fashion. For the purposes of illustration, the drawing shows an apparatus that produces paper 3 and contains at least one roll in the form of a dryer cylinder 1. The FIGURE shows the end of dryer cylinder 1 of an apparatus for the manufacture of paper 3, where there is an axle journal 5 connected through a bearing 7 with the seating structure 9. Bearing 7 is freely carrying, meaning that the outer ring 11 is firmly connected to seating structure 9 and stationary; while the inner ring 13 is linked so that it is allowed to undergo axial movement indicated by a double arrow 15 in case dryer cylinder 1 experiences thermal expansion. Bearing 7 is shown to have a housing 17 to which a hot fluid supply pipe such as a steam supply pipe 19 is firmly connected. The term firm connection in this case indicates that steam supply pipe 19 is rigidly attached to seating structure 9 so that it is not allowed to undergo any axial movement should dryer cylinder 1 experience any thermal expansion. This means that it is not necessary to incorporate any of the commonly used mechanisms into the apparatus which compensate for longitudinal expansions of dryer cylinder 1 along its longitudinal axis of rotation 21. Longitudinal expansion of dryer cylinder 1 occurs inside of bearing 7, where the inner ring 13 will move against outer ring 11 if necessary, caused by a change in the radial clearance between inner ring 13 and outer ring 11 upon relative longitudinal movement between inner ring 13 and outer ring 11. At the same time, a regulator device 23, located inside housing 17 of bearing 7, moves so that the internal cavity 25 of axle journal 5, which in this case is shown to be hollow, will remain sealed if dryer cylinder 1 expands due to thermal expansion.

On the side facing away from bearing 7, dryer cylinder 1 includes an axial bearing which supports dryer cylinder 1 as it is subjected to axial forces. Any sort of common bearing can be used for this purpose and a steam supply pipe 19 can be mounted to it without the use of an expansion compensating device, because any longitudinal displacement of the axle journal 5 does not effect the connection with steam supply pipe 19. The sort of bearing chosen for this purpose is capable of holding up to all the resulting forces and loads.

A rigid connection between steam supply pipe 19 and seating structure 9 is possible because the longitudinal expansion of dryer cylinder 1 or axle journal 5, respectively, due to thermal expansion are accommodated by a freely carrying bearing 7. The particular way in which the dryer cylinder of an apparatus for the manufacture of layers of material is held in the associated bearings as it is described by this invention eliminates the use of commonly required mechanisms which compensate for longitudinal expansion in the axial direction.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for the production of a continuous layer of material, comprising:

at least one roll including an axle journal extending from an end of and concentric with said roll;

a substantially stationary fluid conduit concentric with and extending substantially through said axle journal, said axle journal and said fluid conduit defining a sealed internal cavity;

a bearing assembly including a housing, a seating structure and at least one bearing, said housing connected to said seating structure, each said bearing disposed between said seating structure and said axle journal and rotatably carrying said roll, one of said bearings comprising a freely carrying bearing allowing a limited extent of longitudinal movement of said roll;

a regulator device disposed longitudinally adjacent to said axle journal, said regulator device connected to said axle journal in a fluid-tight relationship and slidably engaged with said housing in a fluid-tight relationship, said regulator device moving with said axle journal and relative to said housing upon occurrence of said longitudinal movement of said roll; and a hot fluid supply pipe rigidly connected to said seating structure and thermally connected to said roll, said hot fluid supply pipe configured for supplying a hot fluid to heat said roll.

2. The apparatus of claim 1, wherein said housing carries said seating structure, said hot fluid supply pipe rigidly attached to said housing.

3. The apparatus of claim 1, wherein said housing carries said seating structure, said hot fluid supply pipe being directly mounted to one of said housing and said seating structure.

4. The apparatus of claim 1, wherein said hot fluid supply pipe comprises a steam supply pipe.

5. The apparatus of claim 1, wherein said one bearing accommodates longitudinal movement of said roll caused by thermal expansion of said roll associated with said heating of said roll.

6. The apparatus of claim 1, wherein said roll comprises a dryer cylinder.

7. The apparatus of claim 1, wherein said apparatus comprises a paper making apparatus.

8. The apparatus of claim 1, wherein said seating structure carries said one bearing.

9. The apparatus of claim 1, wherein said regulating device regulates a fluid flow through said internal cavity.

\* \* \* \* \*